(12) United States Patent
Kim

(10) Patent No.: US 12,080,096 B2
(45) Date of Patent: Sep. 3, 2024

(54) ELECTRONIC DEVICE AND FINGERPRINT RECOGNITION METHOD OF SAME

(71) Applicant: Samsung Electronics Co., Ltd., Suwon-si (KR)

(72) Inventor: Jeonghoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/469,081

(22) Filed: Sep. 18, 2023

(65) Prior Publication Data

US 2024/0029476 A1    Jan. 25, 2024

Related U.S. Application Data

(63) Continuation of application No. PCT/KR2022/003940, filed on Mar. 22, 2022.

(30) Foreign Application Priority Data

Mar. 23, 2021   (KR) .................. 10-2021-0037268

(51) Int. Cl.
*G06V 40/12* (2022.01)
*G06V 10/94* (2022.01)
(Continued)

(52) U.S. Cl.
CPC ........ *G06V 40/1365* (2022.01); *G06V 10/945* (2022.01); *G06V 40/13* (2022.01); *G06V 40/67* (2022.01)

(58) Field of Classification Search
CPC ...... G06V 40/67; G06V 10/945; G06V 40/13; G06V 40/1365; G06V 10/98;
(Continued)

(56) References Cited

U.S. PATENT DOCUMENTS

| 7,039,224 B2 | 5/2006 | Hamid et al. |
| 7,194,115 B2 | 3/2007 | Uchida |

(Continued)

FOREIGN PATENT DOCUMENTS

| EP | 3704612 A1 | 9/2020 |
| JP | 2008-276758 A | 11/2008 |

(Continued)

OTHER PUBLICATIONS

International Search Report dated Jun. 29, 2022, issued in International Patent Application No. PCT/KR2022/003940.

(Continued)

*Primary Examiner* — Premal R Patel
(74) *Attorney, Agent, or Firm* — Jefferson IP Law, LLP

(57) ABSTRACT

An electronic device is provided. The electronic device includes a memory, a fingerprint sensor, a display module, and a processor operatively connected to the memory, the fingerprint sensor, and the display module. The processor may acquire a fingerprint image through the fingerprint sensor, if the first fingerprint recognition operation fails, acquire the first fingerprint image up to the release time of a touch for fingerprint recognition, if the touch is released, determine whether a second fingerprint image is acquired for a predetermined time, if the second fingerprint image is acquired for the predetermined time, determine whether the similarity between the first fingerprint image and the second fingerprint image is greater than or equal to a predetermined threshold, and if the similarity between the first fingerprint image and the second fingerprint image is greater than or equal to the predetermined threshold, recognize the fingerprint.

15 Claims, 8 Drawing Sheets

(51) Int. Cl.
*G06V 40/13* (2022.01)
*G06V 40/60* (2022.01)

(58) Field of Classification Search
CPC ... G06V 10/993; G06F 1/1637; G06F 1/1643;
G06F 1/1684; G06F 1/1626; G06F 21/32;
G06F 3/0481; G06F 2203/04108
See application file for complete search history.

(56) References Cited

U.S. PATENT DOCUMENTS

| | | |
|---|---|---|
| 7,627,150 B2 | 12/2009 | Abiko et al. |
| 9,785,863 B2 | 10/2017 | Naruse et al. |
| 10,949,644 B2 | 3/2021 | Bach |
| 11,017,202 B2 | 5/2021 | Kim et al. |
| 11,023,068 B1 | 6/2021 | Jeon et al. |
| 11,308,311 B2 | 4/2022 | Sandhan et al. |
| 2017/0235998 A1 | 8/2017 | Jin et al. |
| 2017/0351850 A1* | 12/2017 | Jin ................. G06F 21/32 |
| 2017/0364763 A1 | 12/2017 | Jin et al. |
| 2018/0060638 A1 | 3/2018 | Zhou |
| 2019/0130083 A1* | 5/2019 | Agassy ............ G06F 21/32 |
| 2019/0251317 A1 | 8/2019 | Jiang |
| 2021/0055826 A1 | 2/2021 | Park et al. |
| 2021/0056333 A1* | 2/2021 | Cheng ............ G06F 3/04883 |
| 2021/0124903 A1* | 4/2021 | Gao ............... G06F 3/04845 |
| 2022/0058363 A1 | 2/2022 | Moon et al. |
| 2022/0084319 A1 | 3/2022 | Zhu et al. |

FOREIGN PATENT DOCUMENTS

| | | |
|---|---|---|
| JP | 2010-040011 A | 2/2010 |
| JP | 2019-164707 A | 9/2019 |
| JP | 6687684 B2 | 4/2020 |
| JP | 2022-524833 A | 5/2022 |
| KR | 10-0615540 B1 | 8/2006 |
| KR | 10-2017-0094895 A | 8/2017 |
| KR | 10-2017-0136359 A | 12/2017 |
| KR | 10-2017-0141522 A | 12/2017 |
| KR | 10-2018-0085587 A | 7/2018 |
| KR | 10-2019-0074782 A | 6/2019 |
| KR | 10-2019-0095168 A | 8/2019 |
| KR | 10-2019-0098216 A | 8/2019 |
| KR | 10-2019-0099386 A | 8/2019 |
| KR | 10-2026985 B1 | 9/2019 |
| KR | 10-2020-0137450 A | 12/2020 |
| KR | 10-2021-0024310 A | 3/2021 |
| KR | 10-2021-0124829 A | 10/2021 |
| KR | 10-2022-0005960 A | 1/2022 |
| KR | 10-2022-0034265 A | 3/2022 |

OTHER PUBLICATIONS

European Search Report dated Jun. 18, 2024, issued in European Application No. 22776031.1.

* cited by examiner

ELECTRONIC DEVICE AND FINGERPRINT RECOGNITION METHOD OF SAME

CROSS-REFERENCE TO RELATED APPLICATION(S)

This application is a continuation application, claiming priority under § 365(c), of an International application No. PCT/KR2022/003940, filed on Mar. 22, 2022, which is based on and claims the benefit of a Korean patent application number filed on Mar. 23, 2021, in the Korean Intellectual Property Office, the disclosure of which is incorporated by reference herein in its entirety.

BACKGROUND

1. Field

The disclosure relates to an electronic device and a fingerprint recognition method of the electronic device.

2. Description of Related Art

Recently developed electronic devices such as smart phones, tablet personal computers (PCs), portable multimedia players (PMPs), personal digital assistants (PDAs), laptop personal computers (laptops), and wearable devices may provide not only a mobility but also various functions such as e-mails and social network services (SNS) in addition to telephones and text messages.

The electronic device may have a display and may display a screen related to functions based on the display. Additionally, the electronic device may recognize fingerprints by touch using a fingerprint sensor disposed in the display.

The above information is presented as background information only to assist with an understanding of the disclosure. No determination has been made, and no assertion is made, as to whether any of the above might be applicable as prior art with regard to the disclosure.

SUMMARY

In the case of recognizing a fingerprint by touch using a fingerprint sensor disposed in the display of an electronic device, the user may apply pressure for fingerprint recognition. At this time, the image projected on the fingerprint sensor may be distorted or deformed because of the pressure being closely adhered to, and the fingerprint recognition rate of the electronic device may be lowered.

Aspects of the disclosure are to address at least the above-mentioned problems and/or disadvantages and to provide at least the advantages described below. Accordingly, an aspect of the disclosure is to provide improving the fingerprint recognition rate of the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a memory, a fingerprint sensor, a display module, and a processor operatively connected to the memory, the fingerprint sensor, and the display module. The processor may acquire a fingerprint image through the fingerprint sensor in order to perform a first fingerprint recognition operation, if the first fingerprint recognition operation fails, acquire the first fingerprint image up to the release time of a touch for fingerprint recognition, if the touch is released, determine whether a second fingerprint image is acquired for a predetermined time through the fingerprint sensor, if the second fingerprint image is acquired for the predetermined time, determine whether the similarity between the first fingerprint image and the second fingerprint image is greater than or equal to a predetermined threshold, and if the similarity between the first fingerprint image and the second fingerprint image is greater than or equal to the predetermined threshold, recognize the fingerprint by using the first fingerprint image or the second fingerprint image.

In accordance with another aspect of the disclosure, a method of recognizing a fingerprint is provided. The method includes acquiring a fingerprint image through the fingerprint sensor in order to perform a first fingerprint recognition operation, if the first fingerprint recognition operation fails, acquiring the first fingerprint image up to the release time of a touch for fingerprint recognition, if the touch is released, determining whether a second fingerprint image is acquired for a predetermined time through the fingerprint sensor, if the second fingerprint image is acquired for the predetermined time, determining whether the similarity between the first fingerprint image and the second fingerprint image is greater than or equal to a predetermined threshold, and if the similarity between the first fingerprint image and the second fingerprint image is greater than or equal to the predetermined threshold, recognizing the fingerprint by using the first fingerprint image or the second fingerprint image.

An electronic device and a fingerprint recognition method of an electronic device according to various embodiments of the disclosure may further acquire a fingerprint image at a time when the user is not aware of it, thereby improving the fingerprint recognition rate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
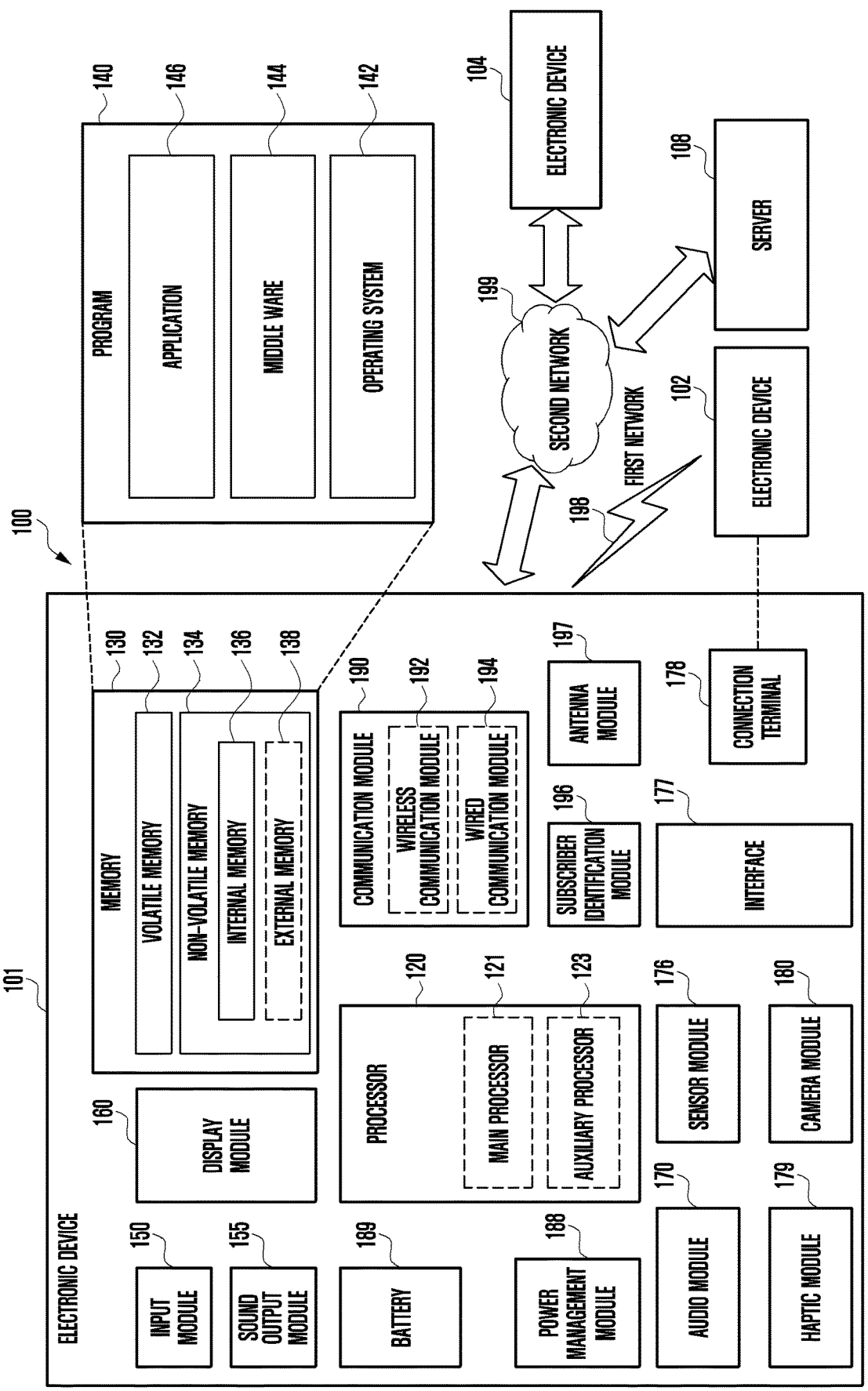
FIG. 1 is a block diagram of an electronic device in a network environment according to an embodiment of the disclosure.

FIG. 1 is a block diagram of an electronic device 101 in a network environment 100 according to an embodiment of the disclosure.

Referring to FIG. 1, an electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. In another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. In an example, the sensor module 176, the camera module 180, or the antenna module 197 may be implemented as embedded in single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, a communication processor (CP), and the like) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

In another embodiment, the auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to one embodiment of the disclosure, the auxiliary processor 123 (e.g., a neural network processing device) may include a hardware structure specified for processing an artificial intelligence model. In another embodiment, the artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. In another embodiment, the artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. In another embodiment, the input module 150 may include, for example, a microphone, a mouse, a keyboard, a key (e.g., a button), a digital pen (e.g., a stylus pen), and the like.

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. In another embodiment, the display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. In another embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may be configured to detect an operational state (e.g., power or temperature) of the electronic device 101 or an environmental state (e.g., a state of a user) external to the electronic device 101, and then generate an electrical signal or data value corresponding to the detected state. In another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may be configured to support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). In another embodiment, the connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In another embodiment, the haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. In another embodiment, the communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a $5^{th}$ generation (5G) network, a next generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may, for example, identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. In an embodiment, the NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a millimeter wave (mmWave) band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., gigabits per second (Gbps) or more), loss coverage for implementing mMTC (e.g., 164 decibels (dB) or less), or U-plane latency for realizing URLLC (e.g., 0.5 milliseconds (ms) or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may, for example, include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to some embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input/output (GPIO), serial peripheral interface (SPI), mobile industry processor interface (MIPI), and the like).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. In an example, if the electronic device 101 should perform a function or a service automatically, or in response to a request from a user or another device, the electronic device 101, instead of, or in addition to, executing the function or the service, may request the one or more external electronic devices to perform at least part of the function or the service. In an embodiment, the one or more external electronic devices receiving the request may perform the at least part of the function or the service requested, or an additional function or an additional service related to the request, and transfer an outcome of the performing to the electronic device 101. In another embodiment, the electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to yet another embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

Figure 2:
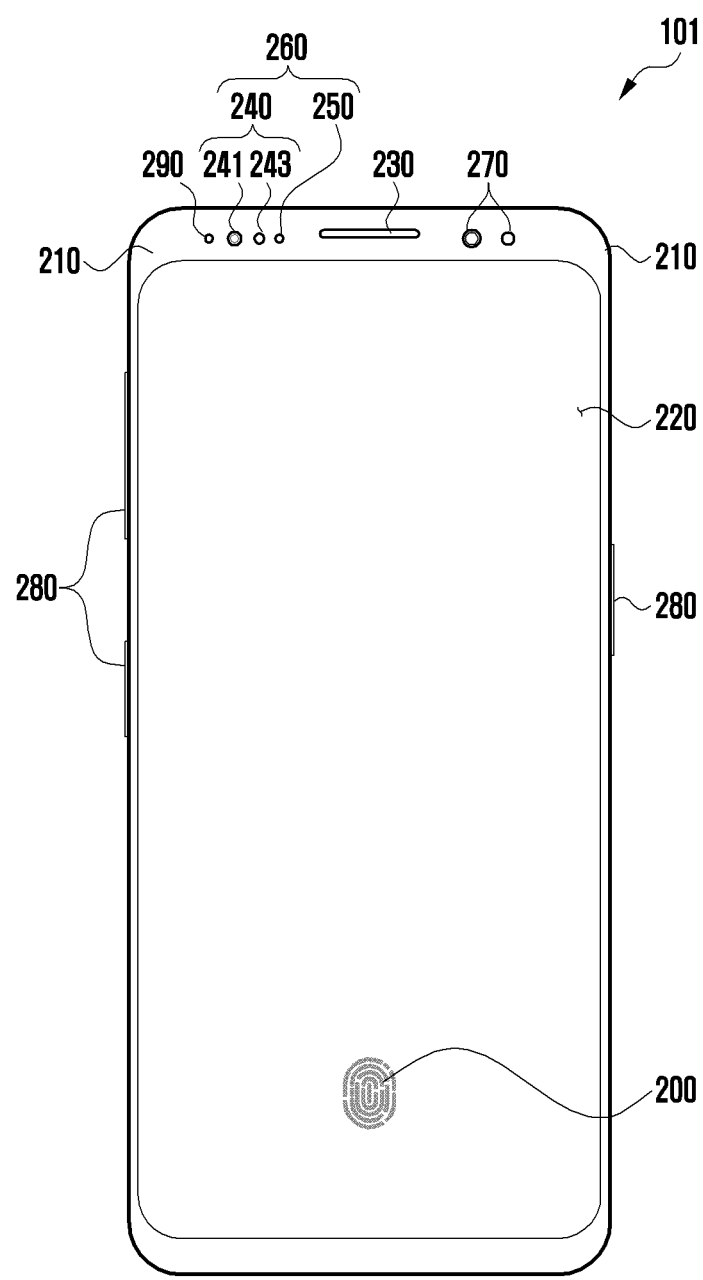
FIG. 2 is a diagram illustrating an example of an electronic device according to an embodiment of the disclosure.

FIG. 2 is a diagram illustrating an electronic device 101 according to an embodiment of the disclosure.

The electronic device 101 may include a housing 210, a display 220 (e.g., a display module 160 of FIG. 1), a sound output module 230 (e.g., a sound output module 155 of FIG. 1), a sensor module 260 (e.g., a sensor module 176 of FIG. 1), a camera module 270 (e.g., a camera module 180 of FIG. 1), a key input device 280 (e.g., an input module 150 of FIG. 1), an indicator 290, and/or a fingerprint sensor 200. In various embodiments, the electronic device 101 may omit at least one of the components (e.g., a key input device 280 or an indicator 290) or additionally include other components.

According to some embodiments, FIG. 2 illustrates an example in which at least one of the sensor module 260 including the proximity sensor and/or the illuminance sensor, the sound output module 230, and/or the camera module 270 is disposed on the front plate (e.g., housing 210) of the electronic device 101, but various embodiments are not limited thereto. In an example, although not shown, the structure in which the sensor module 260, the sound output module 230, and/or the camera module 270 are disposed under (e.g., under panel) the display 220 of the electronic device 101 may be implemented. In another example, the sensor module 260, the sound output module 230, and/or the camera module 270 may be disposed between the front surface of the housing 210 and the rear surface opposite to the front surface and under the display 220 when looking at the display 220 from the front surface of the housing 210. In some embodiments, at least a portion of the sensor module 260, the sound output module 230, and/or the camera module 270 may be disposed in at least one area of the display 220.

According to an embodiment, the sensor module 260, the sound output module 230, and/or the camera module 270 may be disposed in a space formed by the housing 210 of the electronic device 101, and may be exposed to the outside through at least one hole (or an opening) formed in the housing 210, or may be disposed in a space formed by the display 220 of the electronic device 101 and exposed to the outside through at least one hole (or an opening) formed in the display 220.

In an example, the display 220 of the electronic device 101 may be implemented in a design (e.g., a bezel-less display) with an increased area occupied on the front surface, and various components (e.g., a sensor module 260, a sound output module 230, and/or a camera module 270) may be disposed between the display 220 and the rear surface (e.g., the second surface) (or under the display 220), or they may be disposed inside the display 220.

In another example, the electronic device 101 may be implemented to dispose various components between the display 220 and the rear surface (or the lower part of the display 220 (e.g., under panel)) in an under display sensor structure. As yet another example, the electronic device 101 may be implemented in an in display sensor structure so that various components are integrated with the display 220 and formed in the display 220.

In other embodiments, the housing 210 may refer to an outer portion surrounding the electronic device 101. For example, the housing 210 may include a first surface (or a front surface), a second surface (or a rear surface) opposite to the first surface, and a side surface (e.g., a lateral member) surrounding the space between the first surface and the second surface. According to one embodiment, the first surface may be formed by a front plate that is at least partially substantially transparent (e.g., a glass plate or a polymer plate including various coating layers). According to another embodiment, the second surface may be formed by a substantially opaque rear plate. According to yet another embodiment, the rear plate may be formed, for example, of a coated or colored glass, a ceramic, a polymer, a metal (e.g., an aluminum, a stainless steel (STS), or a magnesium), or a combination of at least two of the above materials. According to still another embodiment, the side surface may be formed by a side bezel structure (or a lateral member) including a metal and/or a polymer in combination with the front plate and the rear plate.

In some embodiments, the display 220 (e.g., the display module 160 of FIG. 1) may be disposed on the first surface (e.g., the front plate) of the housing 210 and exposed to the outside. The display 220 may be combined with or adjacent to a digitizer that detects a touch sensor (or touch sensing circuit), a pressure sensor capable of measuring the intensity (pressure) of the touch, and/or a magnetic field digital pen (e.g., a stylus pen). According to one embodiment, the display 220 may be implemented in various forms including a liquid crystal display (LCD), an organic light emitting diode (OLED), or an active matrix OLED (AMOLED). In some embodiments, the display 220 may be planar or curved, or may consist of a combination of planar and curved surfaces. In another embodiment, the display 220 may be composed of a rigid material or a flexible material.

The display 220 may display various images (e.g., video and/or still images) based on the control of the processor (e.g., the processor 120 of FIG. 1). The display 220 may emit light in at least some area to display an image or to acquire biometric information (e.g., a fingerprint image). In another embodiment, the display 220 may include at least one light source (e.g., a pixel) for emitting light. At least one light source may be disposed in an array structure on the display 220. In an example, at least one light source may include a light-emitting element such as an organic light emitting diode (OLED) or a light emitting diode (a micro light-emitting diode (LED)). In an embodiment, at least one light source may provide a designated light according to the control of the processor 120 or the display driver IC (DDI).

Input by various external objects (e.g., human hands and/or digital pens) on the display 220 may be received. In still another embodiment, the display 220 may include a touch sensor (not shown) to receive input by various external objects.

In other embodiments, the touch sensor may be constituted as a layer independent of the display panel of the display 220 or may be implemented in an integrated structure such as a display panel. The touch sensor may receive a touch input implemented by direct contact between the external object and the display 220 or a proximity input implemented by proximity (e.g., hovering) of the external object and the display 220 while the external object is not in contact with the display 220.

In some embodiments, the sound output module 230 may include a speaker. The speaker may include a receiver for the call. According to other embodiments, the sound output module 230 may be disposed at the edge of the bezel area of the electronic device 101 or may include an under panel speaker using the display 220 (e.g., an OLED) as a diaphragm. For example, the under panel speaker may be disposed below the display 220 and may not be visible from the outside.

In various embodiments, the sensor module 260 may generate an electrical signal or data value corresponding to an internal operating state of the electronic device 101 or an external environmental state. In another embodiment, the sensor module 260 may include, for example, a first sensor module 240 (e.g., a proximity sensor), and/or a second sensor module 250 (e.g., an illuminance sensor) disposed on the first surface of the housing 210, and/or a third sensor module (not shown) (e.g., a fingerprint sensor) disposed on the second surface of the housing 210. According to yet another embodiment, the first sensor module 240 (e.g., a proximity sensor) may detect an external object in close proximity to the electronic device 101. The first sensor module 240 may include a light emitting unit 241 that emits infrared rays and a light receiving unit 243 that receives infrared rays reflected by an external object. According to still another embodiment, the second sensor module 250 (e.g., an illuminance sensor) may measure the illumination (e.g., an ambient light) of the surroundings of the electronic device 101. According to some embodiments, the second sensor module 250 may measure illuminance by measuring the amount of light through a pre-generated hole.

In various embodiments, the camera module 270 may include a first camera module 270 disposed on the first surface of the electronic device 101 and/or a second camera module (not shown), and/or a flash (not shown). In another embodiment, the camera module 270 may include one or more lenses, an image sensor, and/or an image signal processor. The flash may include, for example, a light-emitting diode or a xenon lamp. In some embodiments, two or more lenses (e.g., wide-angle and telephoto lenses) and image sensors may be disposed on one side of the electronic device 101.

In other embodiments, the key input device 280 may be disposed on the side surface of the housing 210. In an embodiment, the electronic device 101 may not include some or all of the key input devices 280, and the unincluded key input device 280 may be implemented in another form, such as a soft key on the display 220. In another embodiment, the key input device 280 may be implemented using a touch sensor and/or a pressure sensor included in the display 220.

In various embodiments, the indicator 290, for example, may be disposed on the first surface of housing 210. In an embodiment, the indicator 290, for example, may provide state information of the electronic device 101 in an optical form. For example, the indicator 290 may provide as an LED pilot lamp (or an indicating lamp). In another embodiment, the indicator 290 may provide a light source that is interworked, for example, with the operation of the camera module 270. In yet another embodiment, the indicator 290 may include, for example, a light-emitting element such as an LED, an IR LED, and/or a xenon lamp.

Although not shown, the electronic device 101 may include an input module (not shown) and/or a connector hole (not shown). The input module may include a plurality of microphones disposed to detect the direction of sound. The connector hole may include a first connector hole (e.g., a USB connector) for transmitting and receiving power and/or data with an external electronic device, and/or a second connector hole (or an earphone jack) for transmitting and receiving audio signals with an external electronic device. According to one embodiment, the electronic device 101, for example, may further include at least one of a sensor module not shown (e.g., the sensor module 176 of FIG. 1), a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, and the like.

In various embodiments, the electronic device 101 may provide a fingerprint recognition (e.g., a fingerprint on display (FOD) or an in-display fingerprint) (hereinafter referred to as 'display fingerprint recognition') on the display 220. In an example, the electronic device 101 may include a fingerprint sensor 200 (e.g., a display fingerprint sensor) in a portion of the space (or under the display 220 (e.g., the under panel)) (or the space formed by the housing 210) between the display 220 and the second surface.

In some embodiments, the fingerprint sensor 200 may be disposed between the display 220 located in front surface (e.g., the first surface) of the electronic device 101 and the rear surface (e.g., the second surface). In other embodiments, the fingerprint sensor 200 may be disposed on a separate button (e.g., a physical home button) at the bottom of the display 220 located on the first surface of the housing 210, and/or a separate button in a portion of the area of the second side. In some embodiments, the electronic device 101 may further include and implement a button-type fingerprint sensor in conjunction with a display fingerprint sensor. In yet other embodiments, the fingerprint sensor 200 may include and implement a total area fingerprint sensor to have an area corresponding to the entire surface (e.g., the total area) of the display 220 (e.g., to support fingerprint recognition through the entire surface of the display 220).

In various embodiments, the electronic device 101 may provide a display fingerprint recognition based on the fingerprint sensor 200. According to one embodiment, the display fingerprint recognition may be implemented so that the fingerprint sensor 200 is disposed under the display 220 (e.g., the under panel) and is not exposed to the outside. For example, the electronic device 101 may dispose the fingerprint sensor 200 on the rear side of the display (e.g., the bottom of the display panel) and recognize a fingerprint touched on the front surface (e.g., the display surface (or the screen)) of the display.

In various embodiments, the fingerprint sensor 200 may recognize a fingerprint input from a user. In another embodiment, the fingerprint sensor 200 may acquire an image (or a fingerprint feature) of a finger fingerprint indicating a difference in the user's unique features.

In other embodiments, the fingerprint sensor 200 may include various configurations, such as an optical method, an ultrasonic method, a capacitive method (or a semiconductor method), a thermal sensing method, a non-contact method, or a combination of these methods.

The optical method may be a method of acquiring a fingerprint image (or an image) reflected in visible light. In an example, the fingerprint sensor 200 may emit light using at least one light source, such as a pixel disposed in the display 220, condense the reflected light of the emitted light from an external object (e.g., a finger), detect the condensed light, and acquire a fingerprint image. In another example, the fingerprint sensor 200 may include a condensing element such as a lens, a microlens, an optical fiber, a pinhole array, or a collimator, and a photo-receiving element such as a photo diode. In yet another example, the fingerprint sensor 200 may include a light-condensing element (e.g., a lens) and an image sensor that generates a fingerprint image.

The ultrasound method may be a method of acquiring a fingerprint image using the principle of ultrasonography. The capacitance method may be a method of acquiring a fingerprint image using the difference in capacitance. For example, the optical method may emit light onto a platen and recognize an image of a reflected fingerprint according to the shape of the fingerprint on the fingertip resting on the platen. In another example, the semiconductor method may be a method using the biometric feature in which it uses the electrical conductivity feature of the skin to directly touch the chip surface with the fingertip and reads the special shape of the fingerprint in contact with the chip surface as an electrical signal. According to an embodiment, the fingerprint sensor 200 may be constituted as a touch sensor type. The touch sensor may dispose the electrodes at intervals smaller than the size and spacing of the valley and ridge of the fingerprint.

The fingerprint sensor 200 may be implemented as a swipe type or a fixed area type. For example, the swipe type may be a method of dragging the position of the fingerprint sensor 200 with a finger, sequentially recognizing a finger (i.e., a fingerprint) dragged on a sensor electrode arranged in one dimension or linearly, and then compositing it into a two-dimensional fingerprint image through post-processing. The fixed area type may be a method of acquiring a two-dimensional fingerprint image while placing a finger on a sensor arranged in two dimensions. According to one embodiment, the touch sensor for recognizing a fingerprint may have an electrode disposed in one or two dimensions.

Figure 3:
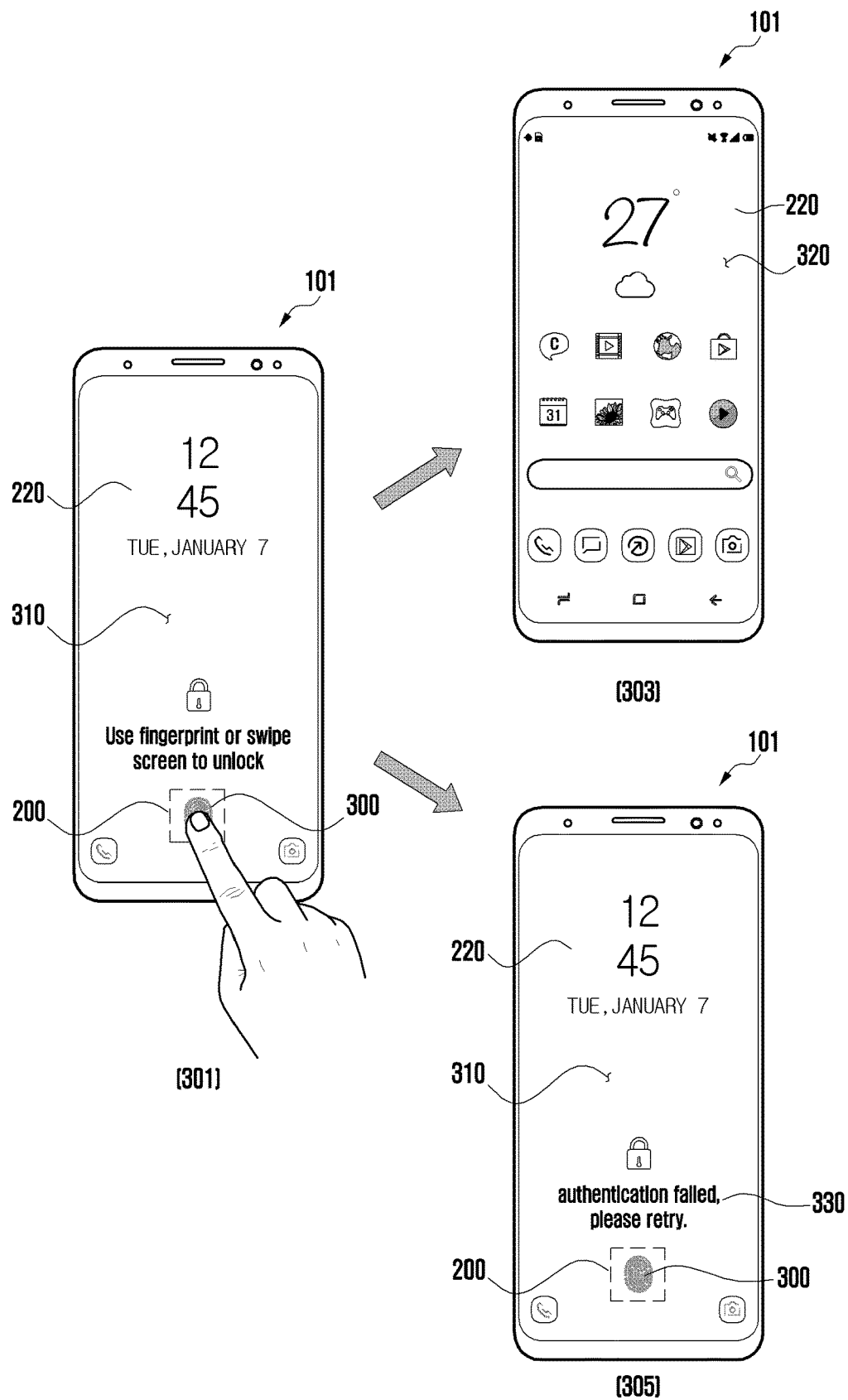
FIG. 3 are drawings illustrating an example of a usage scenario of a fingerprint sensor in an electronic device according to an embodiment of the disclosure.

FIG. 3 are drawings illustrating an example of a usage scenario of a fingerprint sensor 200 in an electronic device 101 according to an embodiment of the disclosure.

FIG. 3 may illustrate an example of an operation in which a user performs an unlocking (e.g., a user authentication) through fingerprint recognition on a lock screen (or a lockscreen).

Referring to FIG. 3, a fingerprint recognition area, i.e., a fingerprint sensor 200, may be disposed on a display 220.

In some embodiments, the first surface of the housing 210 may include a screen display area formed as the display 220 is visually exposed. The screen display area may, for example, include a fingerprint recognition area. The meaning of the screen display area including a fingerprint recognition area may be understood as having at least a portion of the fingerprint recognition area overlapped on the screen display area. In other words, the fingerprint recognition area may display visual information by the display 220 as well as other areas of the screen display area and may additionally refer to an area in which the user's fingerprint information may be acquired.

In other embodiments, the display 220 may be at least one of a power saving state, an inactive state, a sleep state, and/or a dimming state. When the display 220 is at least one of a power saving state, an inactive state, a sleep state, and/or a dimming state, the electronic device 101 may display a lock screen if a touch on the display (i.e., the fingerprint sensor 200) is detected, an input on the physical button is detected, or an input by the sensor module 176 is detected.

When the user performs user authentication on the fingerprint authentication base (e.g., a fingerprint mode), as shown in operation 301, an area on the lock screen 310 being displayed (e.g., an area in which the fingerprint sensor 200 is disposed) may provide an indicator object 300 (e.g., a fingerprint image object and/or a guide text object) that allows fingerprint recognition to be performed (or guided). According to another embodiment, the user may perform the fingerprint recognition by touching the indicator object 300 on the screen 310 (e.g., the lock screen) in which the indicator object 300 for fingerprint recognition is displayed through the display 220 of the electronic device 101.

In various embodiments, the fingerprint recognition may be performed based on a swipe type or a fixed area type in the fingerprint recognition area corresponding to the indicator object 300.

In other embodiments, the fingerprint recognition on the display 220 may be performed when a long touch is performed on the fingerprint recognition area of the display 220 (e.g., on the indicator object 300 area).

When a touch input is detected (e.g., detection of a measurement value provided from a touch sensor) through a fingerprint recognition area corresponding to the indicator object 300, the electronic device 101 may acquire a fingerprint image through the fingerprint sensor 200 and analyze the acquired fingerprint image.

In an embodiment, the electronic device 101 may process an operation related to release of the lock screen through the fingerprint recognition, as shown in operation 303, in the case of determining that the fingerprint image is a complete image (e.g., a fingerprint image when the user fully recognizes the fingerprint through the fingerprint sensor 200) based on the fingerprint image analysis results.

In another embodiment, the electronic device 101 may display a guide object text about the fingerprint recognition success through a user interface in the case of determining that the fingerprint image is a complete image (e.g., a fingerprint image when the user fully recognizes the fingerprint through the fingerprint sensor 200) based on the fingerprint image analysis results.

For example, the electronic device 101 may perform an authentication based on the fingerprint image acquired through the fingerprint sensor 200 and display the screen 320 (e.g., the home screen, the application performing screen) in which the lock screen is released based on the authentication result (e.g., the authentication success) according to the fingerprint recognition.

In some embodiments, when the electronic device 101 fails to recognize a fingerprint based on the fingerprint image analysis results, the electronic device 101, as shown in operation 305, may display an indicator object 300 (e.g., a fingerprint image object and/or a guide text object) that allows fingerprint recognition to be performed (or guided) and/or a guide text object 330 about the fingerprint recognition failure in an area (e.g., an area where the fingerprint sensor 200 is disposed) on the lock screen 310 being displayed.

In other embodiments, the indicator object 300, for example, may be displayed while the fingerprint mode (or a fingerprint recognition function) is activated and may not be displayed while the fingerprint mode is disabled.

In an embodiment, in the following description, the fingerprint mode or the fingerprint recognition mode may be used as terms including a fingerprint registration mode and a fingerprint input mode. According to an embodiment, the fingerprint registration mode may be a mode in which the initial fingerprint is registered to the electronic device 101.

In another embodiment, the electronic device 101 may store (or register or configure) a fingerprint image acquired in the fingerprint registration mode in a designated area (or security area) of the memory 130 (e.g., a slot designated for fingerprint information registration). In yet another embodiment, the electronic device 101 may separately configure a security area in the memory 130 to enhance the security of the fingerprint information, and the security area may be implemented as an embedded security chip or a built-in security area (e.g., an embedded secure element (eSE).

In various embodiments, the fingerprint input mode is a mode in which a fingerprint is input to perform a specified function (e.g., an unlock function, or a fingerprint-based user authentication function) while the fingerprint is registered, and the electronic device 101 may perform the corresponding specific function according to whether it matches by comparing the input fingerprint with the registered fingerprint. In an example, the electronic device 101 may measure similarity based on a comparison of the fingerprint features extracted from the input fingerprint image and the fingerprint features extracted from the fingerprint image stored (or registered) in a designated area of the memory 130. When the score between the input fingerprint image and the registered fingerprint image is greater than or equal to the specified reference score (or threshold score) based on the comparison of fingerprint features, the electronic device 101 may determine that the input fingerprint and the registered fingerprint are similar fingerprints, and that the fingerprint recognition is successful.

Figure 4:
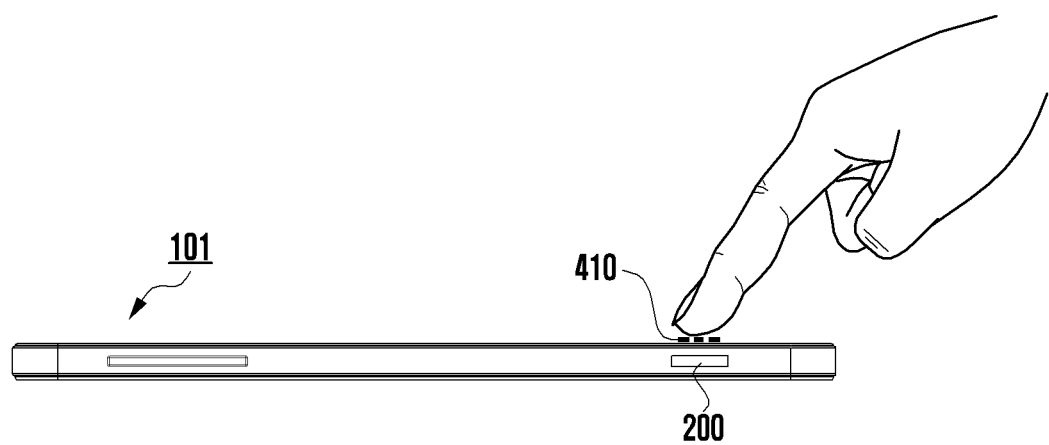
FIGS. 4 and 5 are drawings illustrated to explain an example of finger touch for fingerprint recognition in an electronic device according to various embodiments of the disclosure.
Figure 5:
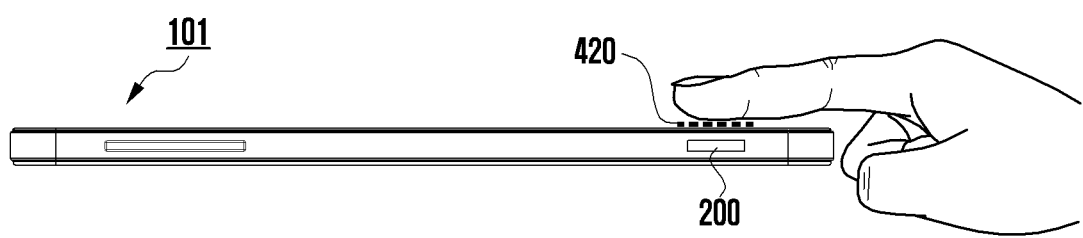

FIGS. 4 and 5 are drawings illustrated to explain an example of finger touch for fingerprint recognition in an electronic device according to various embodiments of the disclosure.

Referring to FIGS. 4 and 5, FIG. 4 may illustrate an example of scanning a fingerprint with a fingertip, and FIG. 5 may illustrate an example of scanning a fingerprint with a whole finger.

In various embodiments, the user may perform a fingerprint input in the same touch manner as FIG. 4 or 5 to recognize a fingerprint.

According to an embodiment, an electronic device 101 may scan a finger to recognize a user's fingerprint.

According to another embodiment, the electronic device 101, under the control of the processor 120, may configure the emitted light of the display 220 in response to the contact of the object (e.g., the finger) and the display 220. The processor 120 may configure the position, intensity, pattern, and/or timing of emitting light from the display 220. For example, if the object is a user's finger, when the fingerprint measurement is initiated, the processor 120 may configure the measurement range of the fingerprint based on the fingerprint information or the contact information (e.g., a contact location, a contact area, a contact strength) in the touch sensor disposed on the display 220. The processor 120 may, for example, control the display 220 to operate at least one light source corresponding to the measurement range.

According to still another embodiment, the electronic device 101 may scan based on a fingertip 410 (e.g., a finger edge portion) (e.g., a touch input having a relatively small area) according to a user input (or touch input) as shown in the example of FIG. 4.

In various embodiments, when scanning a finger to recognize a user's fingerprint, the electronic device 101 may scan with a finger area 420 (e.g., a touch input having a relatively large area) according to the user input (or touch input) as shown in the example of FIG. 5.

In an embodiment, the electronic device 101, under the control of the processor 120, may activate the fingerprint sensor 200 disposed at an area on a display 220 which the finger touches, one surface of the display 220, or under the display 220 in response to a contact of an object (e.g., a finger) and the display 220.

In another embodiment, the processor 120 may detect light reflected from a finger by activating the fingerprint sensor 200 while emitting light at the display 220.

According to yet another embodiment, the fingerprint sensor 200 may generate sensing data (e.g., a sensing value corresponding to a fingerprint image) based on the detected reflected light. For example, the fingerprint sensor 200 may provide the processor 120 with sensing data generated based on the amount of light reflected from the finger among the light emitted from the display 220.

According to still another embodiment, the processor 120 may configure so that light is emitted from the display 220 until all areas corresponding to the fingerprint measurement area are scanned. When the measurement of the area corresponding to the fingerprint measurement range is completed, the processor 120 may form an image of the shape of the user's fingerprint in the fingerprint sensing area based on the stored sensing data.

In an embodiment, when inputting a fingerprint, the user, after entering the area where the fingerprint sensor 200 is located from a certain direction (e.g., an entry from the bottom of the electronic device 101 or an entry from the side surface of the electronic device 101), may enter the area where the fingerprint sensor 200 is located as a swipe type or as a fixed area type that touches the finger on the area where the fingerprint sensor 200 is located for a certain period of time.

In other embodiments, the electronic device 101 may enable not to operate for a touch input by the touch sensor for fingerprint recognition based on the fingerprint sensor 200 while waiting for fingerprint recognition. For example, while the user makes a touch input to the area where the fingerprint sensor 200 is located, and the electronic device 101 performs fingerprint sensing in response to the touch input, the operation (or function) related to the touch input may not be performed.

Figure 6:
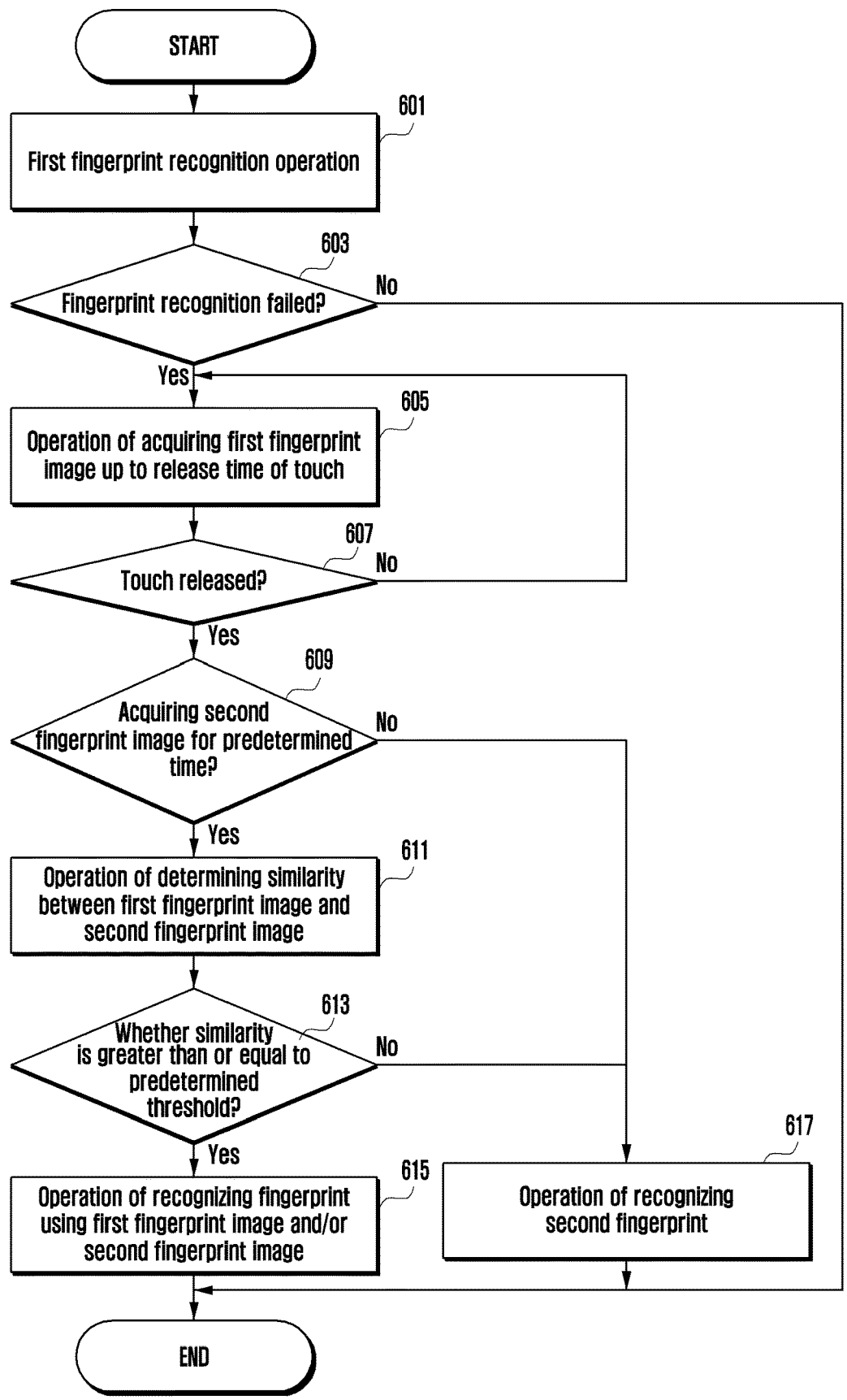
FIG. 6 is a flowchart illustrating a fingerprint recognition method of an electronic device according to an embodiment of the disclosure of the disclosure.

FIG. 6 is a flowchart illustrating a fingerprint recognition method of an electronic device 101 according to an embodiment of the disclosure.

The electronic device 101, in operation 601 under the control of a processor 120, may perform a first fingerprint recognition operation using a fingerprint sensor 200.

The fingerprint sensor 200 may be an in-display sensor disposed in the display module 160.

Referring to FIG. 3, the electronic device 101 may provide an indicator object 300 (e.g., a fingerprint image object and/or a guide text object) that allows the fingerprint recognition to be performed (or guided) in one area (e.g., an area in which the fingerprint sensor 200 is disposed) on the lock screen 310 being displayed.

In some embodiments, the display module 160 may be in either the first state or the second state. The first state may be a state in which the lock screen is displayed, and the second state may be at least one of a power saving state, an inactive state, a sleep state, and/or a dimming state. The electronic device 101 may switch to the first state for the first fingerprint recognition when the display module 160 is in the second state.

In other embodiments, the electronic device 101 may turn on the light source for a predetermined time for the first fingerprint recognition. The fingerprint sensor 200 may emit light onto a platen in an optical method and may acquire and/or recognize an image of the reflected fingerprint according to the shape of the fingerprint of the fingertip resting on the platen.

In still other embodiments, the electronic device 101, in operation 601 under the control of the processor 120, may acquire the fingerprint image from the time when the hovering input to perform a first fingerprint recognition operation is detected on the display module 160.

The electronic device 101, in operation 601 under the control of the processor 120, may acquire a fingerprint image to perform a first fingerprint recognition operation.

In an embodiment, when acquiring a fingerprint image to perform the first fingerprint recognition operation, the electronic device 101, under the control of the processor 120, may acquire at least one of information about the angle of the fingerprint, information on a change in the position of the finger, information on the skin color, width information such as the fingerprint ridge and valley, information about the time or frame at which the fingerprint image disappears, and/or information about the location where the finger is touched on the display module 160.

The electronic device 101, in operation 603 under the control of the processor 120, may determine whether the first fingerprint recognition using the fingerprint sensor 200 fails.

If the first fingerprint recognition fails (operation 603? 'Yes'), the electronic device 101, under the control of the processor 120, may branch from an operation 603 to an operation 605.

If the first fingerprint recognition is successful (operation 603? No'), the electronic device 101 may release the lock screen.

If the first fingerprint recognition fails, the electronic device 101, in operation 605 under the control of the processor 120, may acquire a first fingerprint image up to the release time of the touch.

In other embodiments, the touch release time may be from the time when the first fingerprint recognition fails to the time when the user cancels the touch from the fingerprint sensor 200.

In some embodiments, the time when the first fingerprint recognition fails may be the time when a recognition failure is determined by comparing the fingerprint image acquired through the first fingerprint recognition operation with the registered fingerprint image and the guide text object 330 regarding the fingerprint recognition failure is displayed on the display module 160. In other embodiments, the electronic device 101 may keep the light source of the display 220 turned on even after the first fingerprint recognition fails to acquire the first fingerprint image.

The first fingerprint image may be a plurality of fingerprint images acquired at predetermined time intervals through the fingerprint sensor 200. In various embodiments, when acquiring the first fingerprint image, the electronic device 101, under the control of the processor 120, may acquire at least one of information about the angle of the fingerprint, information on a change in the position of the finger, information on the skin color, width information such as the fingerprint ridge and valley, information about the time or frame at which the fingerprint image disappears, and/or information about the location where the finger is touched on the display module 160.

The electronic device 101, in operation 607 under the control of the processor 120, may determine whether the touch for the first fingerprint recognition is released.

When the touch for the first fingerprint recognition is cancelled (operation 607? 'Yes'), the electronic device 101, under the control of the processor 120, may branch from an operation 607 to an operation 609.

If the touch for the first fingerprint recognition is not cancelled (operation 607? No'), the electronic device 101, under the control of the processor 120, may branch from an operation 607 to an operation 605.

The electronic device 101, in operation 609 under the control of the processor 120, may determine whether a second fingerprint image is acquired through the fingerprint sensor 200 for a predetermined time.

In various embodiments, the second fingerprint image, under the control of the processor 120, may be a plurality of fingerprint images acquired by the electronic device 101 at predetermined time intervals through the fingerprint sensor 200 to perform the second fingerprint recognition operation.

In other embodiments, the electronic device 101 may keep the light source of the fingerprint sensor 200 turned on for a predetermined time to acquire a second fingerprint image.

In still other embodiments, the electronic device 101 may acquire a second fingerprint image from the time when a hovering input to acquire a second fingerprint image is detected on the display module 160.

In various embodiments, the electronic device 101 may acquire a second fingerprint image from the time when a hovering input to acquire a second fingerprint image is detected on the display module 160 and the user's fingerprint is close to the display module 160.

When acquiring a second fingerprint image through the fingerprint sensor 200 for a predetermined time, the electronic device 101 may display a user interface for inducing a user's fingerprint contact for a predetermined time on the display module 160. The user interface for inducing a user's fingerprint contact may be, for example, at least one of a numeric count, a picture change on the screen, or an animation effect.

In various embodiments, when the user performs a fingerprint input using the fingerprint sensor 200 for fingerprint recognition, the electronic device 101 may calculate the time for the user to retry the fingerprint input if the fingerprint recognition fails. The electronic device 101, under the control of the processor 120, may determine a predetermined time to acquire a second fingerprint image based on the time for the user to retry the fingerprint input if the fingerprint recognition fails. A predetermined time, under the control of the processor 120 may be, for example, updated by learning a user pattern from the electronic device 101.

In various embodiments, when acquiring a second fingerprint image, the electronic device 101, under the control of the processor 120, may acquire at least one of information about the angle of the fingerprint, information on a change in the position of the finger, information on the skin color, width information such as the fingerprint ridge and valley, information about the time or frame at which the fingerprint image disappears, and/or information about the location where the finger is touched on the display module 160.

After acquiring a second fingerprint image through the fingerprint sensor 200 for a predetermined time (operation 609—'Yes'), the electronic device 101, under the control of the processor 120, may branch from operation 609 to operation 611.

If a second fingerprint image is not acquired through the fingerprint sensor 200 for a predetermined time (operation 609—'No'), the electronic device 101, under the control of the processor 120, may branch from operation 609 to operation 617.

The electronic device 101, in operation 611 under the control of the processor 120, may determine the similarity of the first fingerprint image and the second fingerprint image. The first fingerprint image may be, for example, an image acquired up to the time of the release of a touch after the first fingerprint recognition failure, and the second fingerprint image may be an image acquired for a predetermined time after touch release.

The electronic device 101, in operation 613 under the control of the processor 120, may determine whether the similarity between the first fingerprint image and the second fingerprint image is greater than or equal to a predetermined threshold.

If the similarity between the first fingerprint image and the second fingerprint image is greater than or equal to a predetermined threshold (operation 613—'Yes'), the electronic device 101, under the control of the processor 120, may branch from operation 613 to operation 615.

If the similarity between the first fingerprint image and the second fingerprint image is less than a predetermined threshold (operation 613—'No'), the electronic device 101, under the control of the processor 120, may branch from operation 613 to operation 617.

In an embodiment, the electronic device 101, in operation 615 under the control of the processor 120, may recognize a fingerprint using a first fingerprint image and/or a second fingerprint image.

In various embodiments, the electronic device 101, in operation 615 under the control of the processor 120, may recognize the fingerprint by selecting an image whose image quality is greater than or equal to a predetermined quality among the first fingerprint image or the second fingerprint image.

In other embodiments, the electronic device 101, in operation 615 under the control of the processor 120, may recognize the fingerprint by selecting an image with better image quality among the first fingerprint image or the second fingerprint image.

The electronic device 101, in operation 617 under the control of the processor 120, may perform a second fingerprint recognition operation using the fingerprint sensor 200. The second fingerprint recognition operation may be similar to the first fingerprint recognition operation.

In some embodiments, the electronic device 101, in operation 617 under the control of the processor 120, may discard the first fingerprint image acquired in operation 605 and perform the second fingerprint recognition operation to acquire a new fingerprint image using the fingerprint sensor 200.

Figure 7:
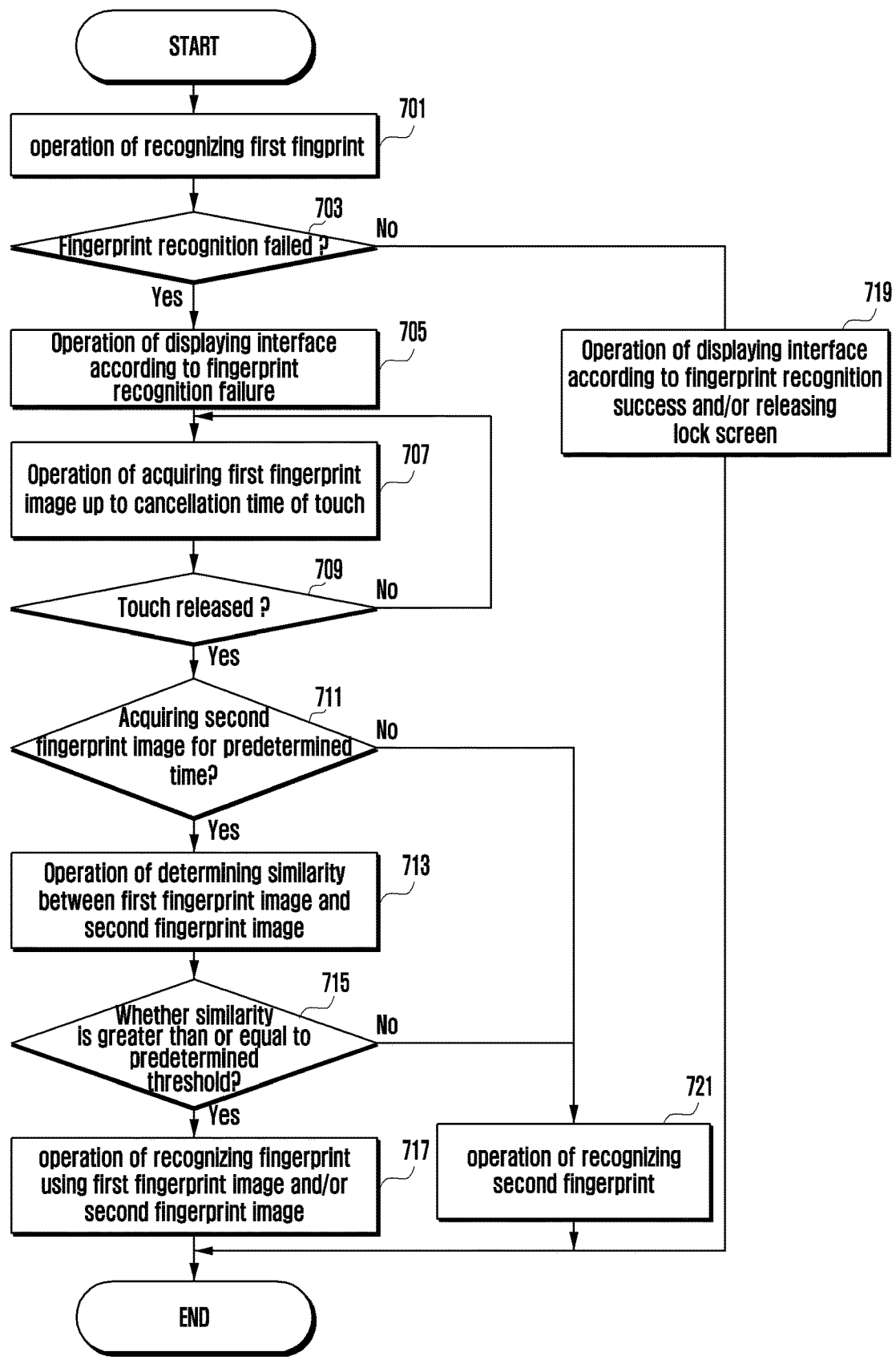
FIG. 7 is a flowchart illustrating a fingerprint recognition method of an electronic device according to an embodiment of the disclosure of the disclosure.

FIG. 7 is a flowchart illustrating a fingerprint recognition method of an electronic device 101 according to an embodiment of the disclosure.

The electronic device 101, in operation 701 under the control of a processor 120, may perform a fingerprint recognition operation using a fingerprint sensor 200.

The fingerprint sensor 200 may be an in-display sensor disposed in the display module 160.

In some embodiments, the electronic device 101, in operation 701 under the control of the processor 120, may acquire a fingerprint image from the time when a hovering input to perform a fingerprint recognition operation is detected on the display module 160.

In other embodiments, the electronic device 101, in operation 701 under the control of the processor 120, may acquire a fingerprint image to perform a fingerprint recognition operation.

In still other embodiments, the electronic device 101, in operation 701 under the control of the processor 120, may acquire at least one of information about the angle of the fingerprint, information on a change in the position of the finger, information on the skin color, width information such as the fingerprint ridge and valley, information about the time or frame at which the fingerprint image disappears, and/or information about the location where the finger is touched on the display module 160.

The electronic device 101, in operation 703 under the control of the processor 120, may determine whether the fingerprint recognition using the fingerprint sensor 200 fails.

The electronic device 101, under the control of the processor 120, may branch from operation 703 to operation 705 if fingerprint recognition using the fingerprint sensor 200 fails (operation 703—'Yes').

The electronic device 101, under the control of the processor 120, may branch from operation 703 to operation 719 if fingerprint recognition using the fingerprint sensor 200 is successful (operation 703—'No').

The electronic device 101, in operation 719 under the control of the processor 120, may display a user interface through the display module 160 and/or perform an unlock operation following the successful fingerprint recognition using the fingerprint sensor 200. The electronic device 101, in operation 705 under the control of the processor 120, may display a user interface following the fingerprint recognition failure through the display module 160.

Referring to FIG. 3, the user interface following the fingerprint recognition success or the fingerprint recognition failure may include a guide text object (not shown) for the fingerprint recognition success or a guide text object 330 for the fingerprint recognition failure.

If fingerprint recognition fails, the electronic device 101, in operation 707 under the control of the processor 120, may acquire a first fingerprint image up to the time of the touch release.

In various embodiments, the touch cancellation time may be from the time when the first fingerprint recognition fails to the time when the user releases the touch from the fingerprint sensor 200.

In other embodiments, the first fingerprint image may be a plurality of fingerprint images acquired at predetermined time intervals through the fingerprint sensor 200.

In still other embodiments, when acquiring the first fingerprint image, the electronic device 101, under the control of the processor 120, may acquire at least one of information about the angle of the fingerprint, information on a change in the position of the finger, information on the skin color, width information such as the fingerprint ridge and valley, information about the time or frame at which the fingerprint image disappears, and/or information about the location where the finger is touched on the display module 160.

The electronic device 101, in operation 709 under the control of the processor 120, may determine whether the touch for fingerprint recognition is released.

If the touch for fingerprint recognition is cancelled (operation 709—'Yes'), the electronic device 101, under the control of processor 120, may branch from operation 709 to operation 711.

If the touch for fingerprint recognition is not cancelled (operation 709—'No'), the electronic device 101, under the control of processor 120, may branch from operation 709 to operation 707.

The electronic device 101, in operation 711 under the control of the processor 120, may determine whether a second fingerprint image is acquired through the fingerprint sensor 200 for a predetermined time.

In various embodiments, the second fingerprint image may be a plurality of fingerprint images acquired at predetermined time intervals through the fingerprint sensor 200.

In other embodiments, the electronic device 101 may keep the light source of the fingerprint sensor 200 turned on for a predetermined time to acquire a second fingerprint image.

In some embodiments, the electronic device 101 may acquire a second fingerprint image from the time when a hovering input to acquire a second fingerprint image is detected on the display module 160.

The electronic device 101 may acquire the second fingerprint image from the time when a hovering input to acquire a second fingerprint image is detected on the display module 160 and the user's fingerprint is close to the display module 160.

In various embodiments, when acquiring a second fingerprint image through the fingerprint sensor 200 for a predetermined time, the electronic device 101 may display a user interface for inducing a user's fingerprint contact for a predetermined time on the display module 160. The user interface for inducing a user's fingerprint contact may be at least one of a numeric count, a picture change on the screen, or an animation effect.

When the user uses the fingerprint sensor 200, the electronic device 101 may calculate the time for the user to retry if the fingerprint recognition fails. The electronic device 101, under the control of the processor 120, may determine a predetermined time to acquire a second fingerprint image based on the time for the user to retry if the fingerprint recognition fails. A predetermined time, under the control of the processor 120, may be updated by learning a user pattern from the electronic device 101.

In other embodiments, when acquiring a second fingerprint image, the electronic device 101, under the control of the processor 120, may acquire at least one of information about the angle of the fingerprint, information on a change in the position of the finger, information on the skin color, width information such as the fingerprint ridge and valley, information about the time or frame at which the fingerprint image disappears, and/or information about the location where the finger is touched on the display module 160.

Upon acquiring a second fingerprint image through the fingerprint sensor 200 for a predetermined time (operation 711—'Yes'), the electronic device 101, under the control of the processor 120, may branch from operation 711 to operation 713.

If a second fingerprint image is not acquired through the fingerprint sensor 200 for a predetermined time (operation 711—'No'), the electronic device 101, under the control of the processor 120, may branch from operation 711 to operation 721.

The electronic device 101, under the control of the processor 120, may determine the similarity of the first fingerprint image and the second fingerprint image in operation 713. The first fingerprint image may be an image acquired up to the time of the cancellation of a touch after the first fingerprint recognition failure, and the second fingerprint image may be an image acquired for a predetermined time after the touch cancellation.

In an embodiment, the electronic device 101, in operation 715 under the control of the processor 120, may determine whether the similarity of the first fingerprint image and the second fingerprint image is greater than or equal to a predetermined threshold.

If the similarity between the first fingerprint image and the second fingerprint image is greater than or equal to a predetermined threshold (operation 715—'Yes'), the electronic device 101, under the control of the processor 120, may branch from the operation 715 to the operation 717.

If the similarity between the first fingerprint image and the second fingerprint image is less than a predetermined threshold (operation 715—'No'), the electronic device 101, under the control of the processor 120, may branch from operation 715 to operation 721.

In another embodiment, the electronic device 101, in operation 717 under the control of the processor 120, may recognize a fingerprint using a first fingerprint image and/or a second fingerprint image.

In various embodiments, the electronic device 101, in operation 717 under the control of the processor 120, may recognize the fingerprint by selecting an image whose image quality is greater than or equal to a predetermined quality among the first fingerprint image or the second fingerprint image.

In various embodiments, the electronic device 101, in operation 717 under the control of the processor 120, may recognize the fingerprint by selecting an image with better image quality among the first fingerprint image or the second fingerprint image.

In yet another embodiment, the electronic device 101, in operation 721 under the control of the processor 120, may perform a new fingerprint recognition operation using the fingerprint sensor 200. The new fingerprint recognition operation of the operation 721 may be similar to the fingerprint recognition operation of the operation 701.

In various embodiments, the electronic device 101, in operation 721 under the control of the processor 120, may discard the first fingerprint image acquired in operation 709 and perform a new fingerprint recognition operation to acquire a new fingerprint image using the fingerprint sensor 200.

Figure 8:
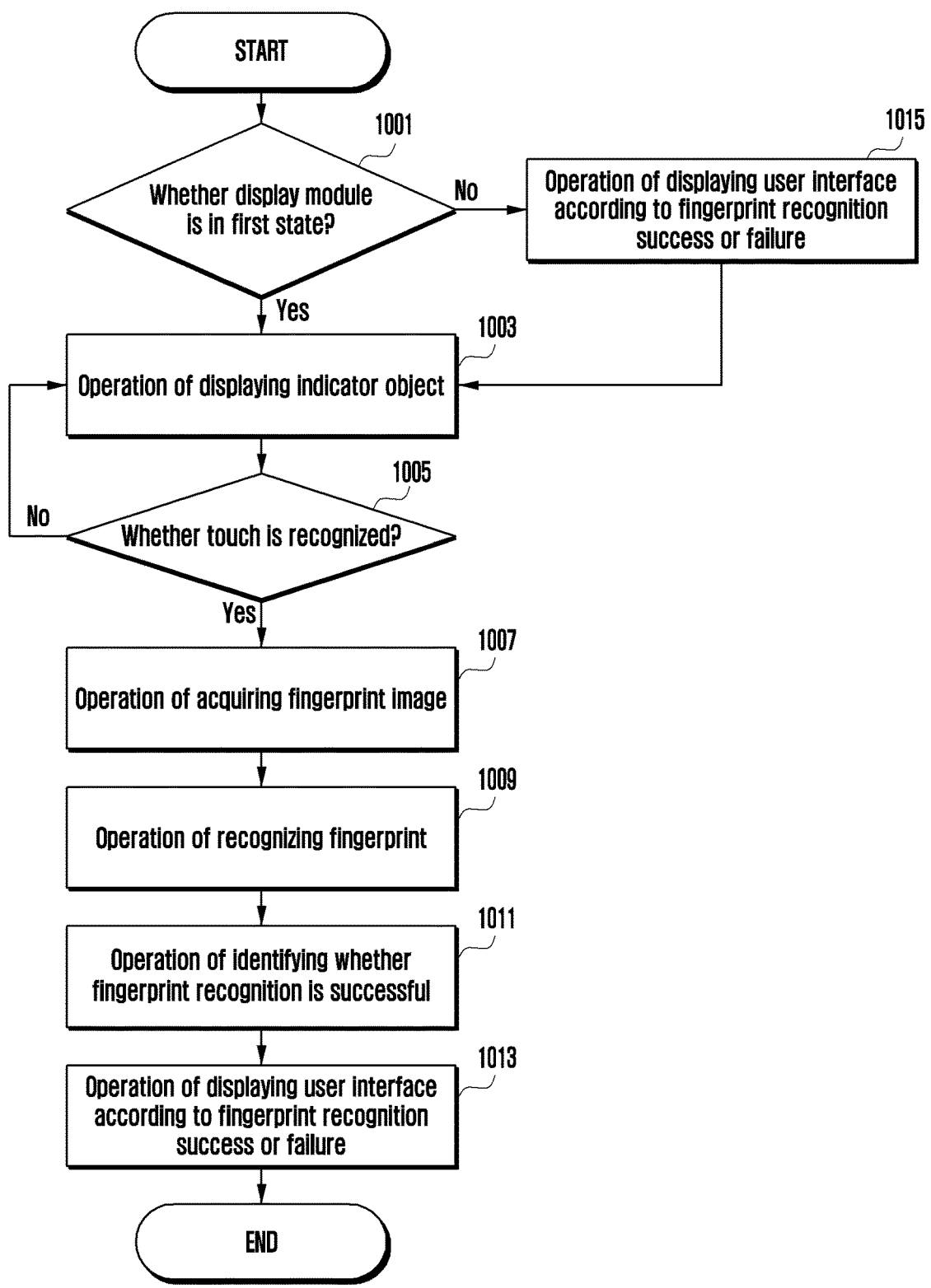
FIG. 8 is a flowchart illustrating a fingerprint recognition method of an electronic device according to an embodiment of the disclosure.

FIG. 8 is a flowchart illustrating a fingerprint recognition method of an electronic device 101 according to an embodiment of the disclosure.

In various embodiments, an electronic device 101, in operation 1001 under the control of a processor 120, may determine whether a display module 160 is in the first state.

If the display module 160 is in the first state (operation 1001—'Yes'), the electronic device 101, under the control of the processor 120, may branch from operation 1001 to operation 1003.

If the display module 160 is in the second state (operation 1001—'No'), the electronic device 101, under the control of the processor 120, may branch from operation 1001 to operation 1015.

In some embodiments, the display module 160 may be in either the first state or the second state. The first state may be a state in which the lock screen is displayed, and the second state may be at least one of a power saving state, an inactive state, a sleep state, and/or a dimming state.

The electronic device 101, in operation 1015 under the control of the processor 120, may change the display module 160 from the second state to the first state and branch into the operation 1003.

The electronic device 101, in operation 1003 under the control of the processor 120, may display an indicator object 300 (e.g., a fingerprint image object and/or a guide text object) on the display module 160 that allows fingerprint recognition to be performed (or guided).

The electronic device 101, in operation 1005 under the control of the processor 120, may determine whether a touch for fingerprint recognition is detected.

If a touch for fingerprint recognition is detected (operation 1005—'Yes'), the electronic device 101, under the control of the processor 120, may branch from operation 1005 to operation 1007.

If no touch for fingerprint recognition is detected (operation 1005—'No'), the electronic device 101, under the control of the processor 120, may branch from operation 1005 to operation 1003.

In an embodiment, the electronic device 101, in operation 1007 under the control of the processor 120, may acquire a fingerprint image using the fingerprint sensor 200 when a touch for fingerprint recognition is detected.

In another embodiment, the electronic device 101, in operation 1009 under the control of the processor 120, may recognize a fingerprint based on the acquired fingerprint image.

In various embodiments, the electronic device 101, in operation 1009 under the control of the processor 120, may perform a fingerprint recognition operation by comparing a pre-registered fingerprint image based on the acquired fingerprint image.

The electronic device 101, in operation 1011 under the control of the processor 120, may identify whether the fingerprint recognition is successful.

In yet another embodiment, the electronic device 101, in operation 1011 under the control of the processor 120, may compare the pre-registered fingerprint image based on the acquired fingerprint image and identify the success of fingerprint recognition. For example, the electronic device 101, under the control of the processor 120, may determine that fingerprint recognition is successful if the pre-registered fingerprint image and the acquired fingerprint image are similar beyond a predetermined threshold. In another example, the electronic device 101, under the control of the processor 120, may determine that the fingerprint recognition fails if the pre-registered fingerprint image and the acquired fingerprint image are similar below a predetermined threshold.

The electronic device 101, in operation 1013 under the control of the processor 120, may display a user interface according to the success or failure of fingerprint recognition. The user interface may include a guide text object for fingerprint recognition success or a guide text object for fingerprint recognition failure.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to"

another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

The various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a memory;
    a fingerprint sensor;
    a display module; and
    a processor operatively connected to the memory, the fingerprint sensor, and the display module, wherein the processor:
        acquires a fingerprint image through the fingerprint sensor to perform a first fingerprint recognition operation,
        if the first fingerprint recognition operation fails, acquires a first fingerprint image up to a release time of a touch for fingerprint recognition,
        if the touch is released, determines whether a second fingerprint image is acquired through the fingerprint sensor for a predetermined time,
        if the second fingerprint image is acquired during the predetermined time, determines whether a similarity of the first fingerprint image and the second fingerprint image is greater than or equal to a predetermined threshold, and
        if the similarity between the first fingerprint image and the second fingerprint image is greater than or equal to the predetermined threshold, recognizes a fingerprint using the first fingerprint image or the second fingerprint image.

2. The electronic device of claim 1, wherein the processor releases a lock screen if the first fingerprint recognition operation is successful.

3. The electronic device of claim 1,
    wherein the processor discards the first fingerprint image, and
    wherein the processor performs a second fingerprint recognition operation using the fingerprint sensor if the second fingerprint image is not acquired for the predetermined time.

4. The electronic device of claim 1,
    wherein the processor discards the first fingerprint image, and
    wherein the processor performs a second fingerprint recognition operation if the similarity between the first fingerprint image and the second fingerprint image is less than the predetermined threshold.

5. The electronic device of claim 1, wherein the processor acquires at least one of:
    information about an angle of the fingerprint;
    information on a change in a position of a finger;
    information on a skin color, width information such as a fingerprint ridge and valley;
    information about a time or frame at which the fingerprint image disappears; and/or
    information about a location where the finger is touched on the display module.

6. The electronic device of claim 1,
    wherein the processor displays an indicator object for guiding fingerprint recognition on the display module, and
    wherein the processor acquires the second fingerprint image from a time when a hovering input is detected on the display module and a user's fingerprint is close to the display module.

7. The electronic device of claim 1,
wherein the processor displays a user interface for inducing a user's fingerprint contact for a predetermined time on the display module,
wherein the processor determines the predetermined time for acquiring the second fingerprint image based on a time for a user to retry if the fingerprint recognition fails,
wherein the processor recognizes a fingerprint by selecting an image whose image quality is greater than or equal to a predetermined quality among the first fingerprint image or the second fingerprint image, and
wherein the user interface is at least one of a numeric count, a picture change on a screen or an animation effect.

8. A method of recognizing a fingerprint, the method comprising:
acquiring a fingerprint image through a fingerprint sensor to perform a first fingerprint recognition operation;
if the first fingerprint recognition operation fails, acquiring a first fingerprint image up to a release time of a touch for fingerprint recognition;
if the touch is released, determining whether a second fingerprint image is acquired through the fingerprint sensor for a predetermined time;
if the second fingerprint image is acquired for the predetermined time, determining whether a similarity of the first fingerprint image and the second fingerprint image is greater than or equal to a predetermined threshold; and
if the similarity between the first fingerprint image and the second fingerprint image is greater than or equal to the predetermined threshold, recognizing the fingerprint using the first fingerprint image or the second fingerprint image.

9. The method of claim 8, further comprising:
releasing a lock screen when the first fingerprint recognition operation is successful.

10. The method of claim 8, further comprising:
discarding the first fingerprint image; and
recognizing a second fingerprint if the second fingerprint image is not acquired for the predetermined time.

11. The method of claim 8, further comprising:
discarding the first fingerprint image; and
recognizing the second fingerprint image by acquiring a new fingerprint image using the fingerprint sensor if the similarity between the first fingerprint image and the second fingerprint image is less than the predetermined threshold.

12. The method of claim 8, wherein the acquiring of the fingerprint image through the fingerprint sensor to perform the first fingerprint recognition operation further comprises acquiring at least one of:
information about an angle of the fingerprint;
information on a change in a position of a finger;
information on a skin color, width information such as a fingerprint ridge and valley;
information about a time or frame at which the fingerprint image disappears; and/or
information about a location where the finger is touched on a display.

13. The method of claim 8, wherein the acquiring of the fingerprint image through the fingerprint sensor to perform the first fingerprint recognition operation further comprises displaying an indicator object guiding fingerprint recognition on the display.

14. The method of claim 8, further comprising:
acquiring the second fingerprint image from a time when a hovering input is detected on a display and a user's fingerprint is close to the display.

15. The method of claim 8, further comprising:
displaying a user interface for inducing a user's fingerprint contact on the display for a predetermined time;
determining the predetermined time for acquiring the second fingerprint image based on a time for a user to retry if the fingerprint recognition fails; and
recognizing the fingerprint by selecting an image whose image quality is great than or equal to a predetermined quality among the first fingerprint image or the second fingerprint image,
wherein the user interface is at least one of a numeric count, a picture change on a screen, or an animation effect.

* * * * *